(12) United States Patent
Frenger et al.

(10) Patent No.: US 8,855,004 B2
(45) Date of Patent: *Oct. 7, 2014

(54) METHODS AND ARRANGEMENTS FOR ESTABLISHING A RADIO CONNECTION IN A COMMUNICATION SYSTEM

(75) Inventors: Pål Frenger, Linköping (SE); Erik Eriksson, Linköping (SE); Fredrik Gunnarsson, Linköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 110 days.

This patent is subject to a terminal disclaimer.

(21) Appl. No.: 13/817,849

(22) PCT Filed: Sep. 22, 2010

(86) PCT No.: PCT/SE2010/000230
§ 371 (c)(1),
(2), (4) Date: Feb. 20, 2013

(87) PCT Pub. No.: WO2012/039652
PCT Pub. Date: Mar. 29, 2012

(65) Prior Publication Data
US 2013/0148536 A1    Jun. 13, 2013

(51) Int. Cl.
*H04L 1/00* (2006.01)
*H04L 12/26* (2006.01)
*H04W 4/00* (2009.01)

(52) U.S. Cl.
USPC .......................................... 370/252; 370/329

(58) Field of Classification Search
CPC ....... H04L 47/10; H04L 43/50; H04W 80/04; H04W 88/06; H04W 28/04; H04W 72/04
USPC .......................................... 370/252, 328, 329
See application file for complete search history.

(56) References Cited

U.S. PATENT DOCUMENTS

| | | |
|---|---|---|
| 2007/0167180 A1 | 7/2007 | Ramesh et al. |
| 2009/0011767 A1 | 1/2009 | Malladi et al. |
| 2009/0185543 A1 | 7/2009 | Chen et al. |
| 2010/0080154 A1 | 4/2010 | Noh et al. |
| 2010/0323709 A1 | 12/2010 | Nam et al. |
| 2011/0164593 A1 | 7/2011 | Huet et al. |

FOREIGN PATENT DOCUMENTS

| | | |
|---|---|---|
| EP | 2395787 A1 | 12/2011 |
| JP | 2010028545 A | 2/2010 |
| WO | 9904593 A1 | 1/1999 |
| WO | 0056103 A1 | 9/2000 |
| WO | 0207459 A2 | 1/2002 |

(Continued)

OTHER PUBLICATIONS

ZTE, "On DL Component Carrier Ambiguity in Initial Random Access Procedure", 3GPP TSG RAN WG1 Meeting #57, San Francisco, USA, May 4, 2009, R1-091700. pp. 1-8. 3GPP, Sophia-Antipolis, France.

(Continued)

*Primary Examiner* — Ronald Abelson
(74) *Attorney, Agent, or Firm* — Coats & Bennett, PLLC

(57) ABSTRACT

This invention pertains in general to the field of establishment of radio connection in a communication system. More particularly the invention relates to establishing a radio connection in a communication system. By broadcasting Random Access Channel related system information, user equipments can send a RACH request and receive a set of DL demodulation reference signals associated with a DL control channel.

21 Claims, 7 Drawing Sheets

(56) References Cited

FOREIGN PATENT DOCUMENTS

| WO | 02069525 A1 | 9/2002 |
|---|---|---|
| WO | 03077457 A1 | 9/2003 |
| WO | 2008024788 A2 | 2/2008 |
| WO | 2009041878 A1 | 4/2009 |
| WO | 2010002303 A1 | 1/2010 |
| WO | 2010075701 A1 | 7/2010 |

OTHER PUBLICATIONS

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", Technical Specification, 3GPP TS 36.300 V10.0.0, Jun. 1, 2010. 3GPP, Sophia-Antipolis, France.

3RD Generation Partnership Project, "3rd Generation Partnership Project; Technical Specification Group Radio Access Network; Evolved Universal Terrestrial Radio Access (E-UTRA) Medium Access Control (MAC) protocol specification (Release 8)", Technical Specification, 3GPP TS 36.321 V8.8.0, Dec. 1, 2009, pp. 1-47. 3GPP, Sophia-Antipolis, France.

Ericsson, "Downlink Coordinated Transmission—Impact on Specification", TSG-RAN WG1 #55, Nov. 10, 2008, pp. 1-3, R1-084377, 3rd Generation Partnership Project, Prague, Czech Republic.

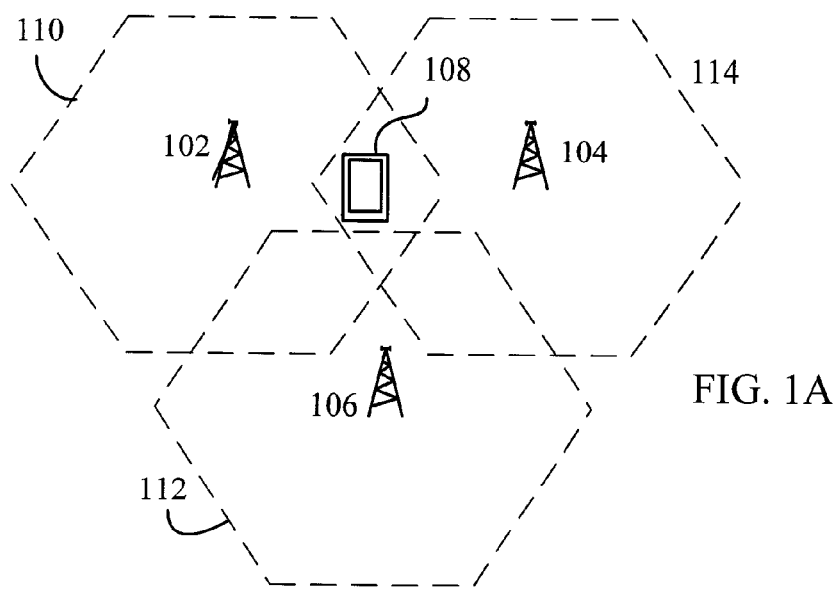
FIG. 1A
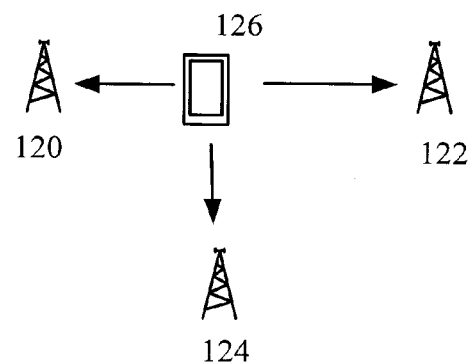
FIG. 1B
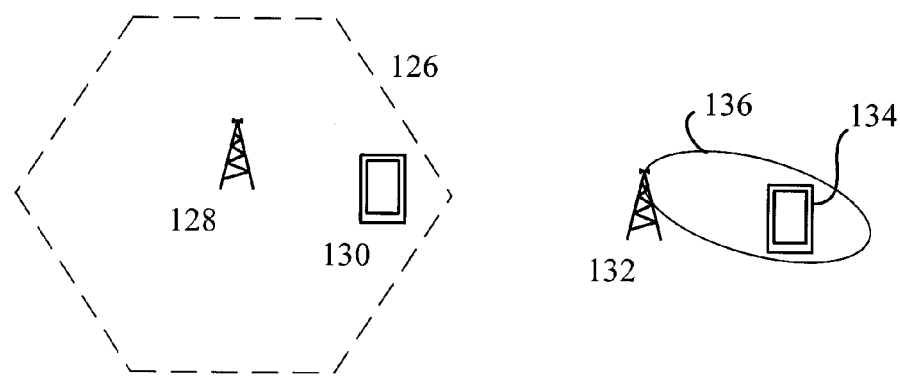
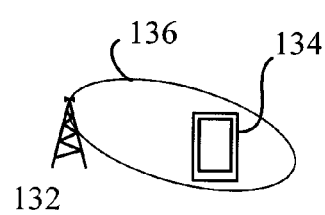
FIG. 1C
FIG. 1D

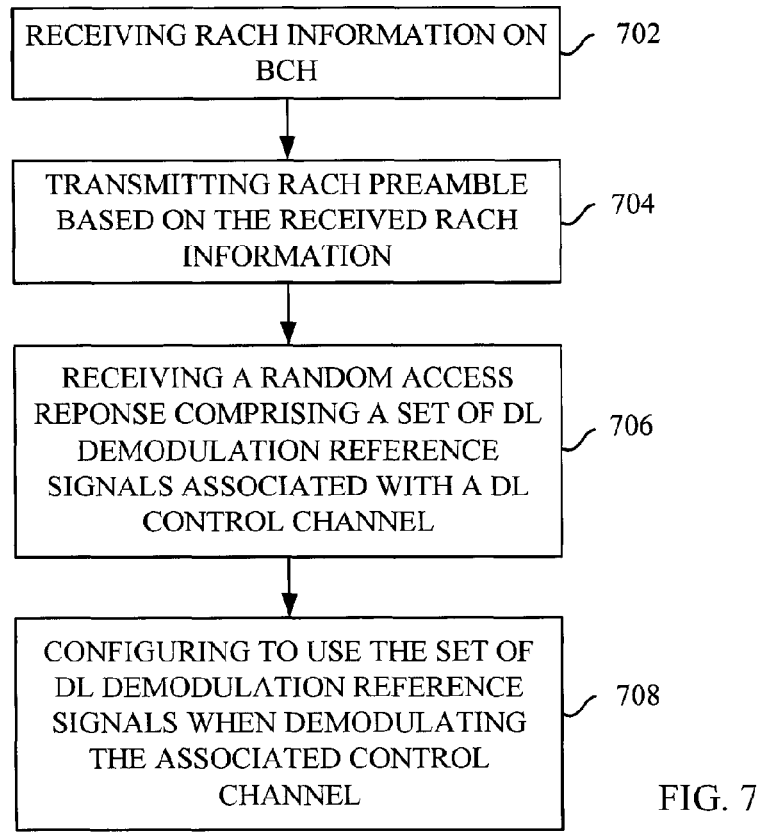
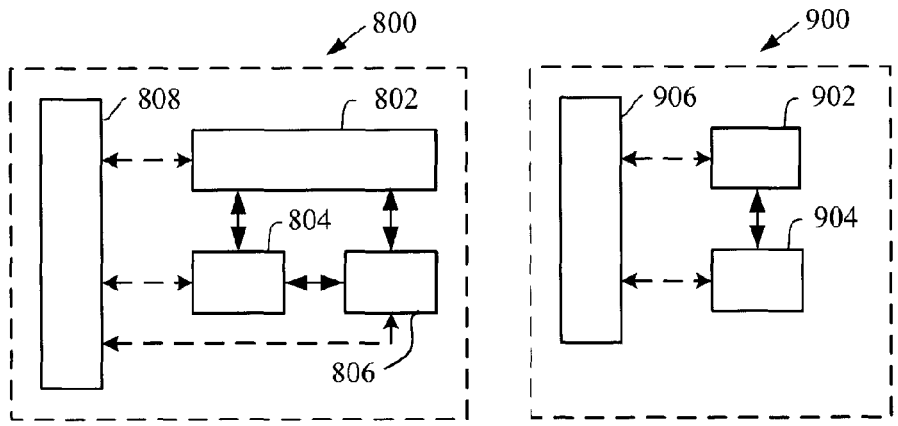
FIG. 7
FIG. 8        FIG. 9

US 8,855,004 B2

METHODS AND ARRANGEMENTS FOR ESTABLISHING A RADIO CONNECTION IN A COMMUNICATION SYSTEM

TECHNICAL FIELD

This invention pertains in general to the field of establishment of radio connection in a communication system. More particularly the invention relates to establishing a radio connection in a communication system.

BACKGROUND

A cell in a radio communication system is traditionally defined as the coverage area of the system broadcast channel. In most 3rd Generation Partnership Project (3GPP) radio communication systems, such as Global System for Mobile communication (GSM), High Speed Packet Access (HSPA), and Long Term Evolution (LTE), the coverage area of the data channels is identical to the coverage area of the broadcast channel. However, as the performance of current systems is improved with novel features supporting Coordinated Multi-Point transmission and reception (CoMP), multi-carrier, and multi-hop, the coupling between system information coverage and data coverage becomes increasingly unmotivated. As will be described below there are several problems associated with this coupling.

Support for Self Optimizing Networks is Limited

If we want to automatically optimize system parameters that affect the coverage, e.g. antenna tilt, antenna beam-width, antenna pointing direction, base station transmission power, etc. then we will always risk that coverage is lost in some locations in the network. The only way we can observe this coverage loss is if customers call in and report to their operator that their service no longer works. The operators typically do not accept this and therefore, antenna and power parameters are planned when the system is deployed and are then left unchanged. The fear of breaking something that works is a show-stopper for many automatic network optimization algorithms. As a consequence most systems operate with sub-optimal settings, which is a problem.

Energy is Wasted in the Network

Now with the introduction of LTE Rel-10, we have designed a system capable of achieving 1 Gbps data throughput. Future LTE releases are expected to provide even higher bitrates and even better system capacity. While there is a commercial drive for higher data transmission rates and higher capacity, there is no need at all to transmit more system information because of that. When we need to increase the capacity in an area then we need to add more cells and as a result the system information channels become over-dimensioned. If an area already has sufficient coverage for system information channels then there is no need for the new cells in that area to transmit any system information at all. In current systems, where every antenna and every carrier in the network has to be observable all the time, most of the energy consumed in the network is spent transmitting system overhead.

Support for Advanced Antenna Techniques Becomes Limited

Traditional beam-forming, where the antenna radiation pattern is adjusted towards a single UE, does not work if that implies that the coverage area of the broadcast channel is affected. In LTE Rel-8 user specific beam-forming is supported to some extent by means of using different pre-coding weights for data and broadcast signals. However we can not adjust the individual antenna elements such that energy is concentrated towards where a user is located since that would also affect the coverage of the broadcast channel.

High Interference Also During Low Load Limits Performance

Since each cell need to continuously transmit system information and mobility measurement signals (i.e. the primary common pilot channel, P-CPICH, in WCDMA and cell specific reference symbols, CRS, in LTE) we will always have a minimum amount of interference in the system. This non-traffic data related source of interference, sometimes known as pilot pollution, significantly limit the system performance during times of low traffic. Without pilot pollution the peak rates, especially during low traffic hours, would be significantly increased.

There is thus a need to overcome the prior art disadvantages.

SUMMARY

According to a first aspect of the present invention, a method in a first Radio Base Station, RBS for communicating radio connection establishment information using Orthogonal Frequency Division Multiplexing, OFDM to a plurality of User Equipments, UEs is provided. The method comprising broadcasting system information on a Broadcast Channel, BCH using a Multicast Broadcast Single Frequency Network, MBSFN radio transmission format to said plurality of UEs, where the system information is related to establishing a radio connection between the first RBS and at least one UE out of the plurality of UEs, and wherein the broadcasting further is performed synchronously in time with broadcasting the same system information on BCH using MBSFN radio transmission format by at least a second RBS. The Method comprises receiving a radio connection establishment request from a UE of the plurality of UEs and the step of performing measurements of the radio connection establishment request as received from the UE. The method comprises sending information related to the measurements of the radio connection establishment request to a second RBS or central controller, as well as obtaining a set of DL demodulation reference signals associated with a DL control channel for the UE. In addition, it comprises transmitting to said UE a radio connection establishment response comprising the set of DL demodulation reference signals associated with a DL control channel.

According to a second aspect of the present invention, a method in a User Equipment, UE for configuring said User Equipment, UE based on radio connection establishment information using Orthogonal Frequency Division Multiplexing, OFDM from a plurality of Radio Base Stations, RBSs. The method comprises receiving broadcast system information on a Broadcast Channel, BCH in dedicated subframes from the plurality of RBSs, and transmitting a radio connection establishment request to a number of RBSs based on the received system information. The method further comprises receiving a radio connection establishment response from an RBS, said radio connection establishment response comprising a set of Downlink, DL demodulation reference signals associated with a DL control channel, and the step of configuring the UE by demodulating said DL control channel using the set of DL demodulation reference signals associated with the DL control channel.

According to a third aspect of the present invention, a Radio Base Station, RBS for communicating radio connection establishment information with a plurality of mobile communication devices, is provided. The RBS comprises a transceiver, a scheduler and a processor. In addition a control unit is comprised. The transmitter is configured to be connected to the scheduler, the processor and to the control unit.

The a transceiver is configured to broadcast system information related to establishing a radio connection on a Broadcast Channel, BCH using a Multicast Broadcast Single Frequency Network, MBSFN radio transmission format to said plurality of User Equipments, UEs, and configured to receive a radio connection establishment request from a UE.

The scheduler is configured to schedule the transceiver to broadcast the system information synchronously in time with at least another RBS broadcasting the same system information on BCH using MBSFN radio transmission format. The processor is configured to be connected to the scheduler, and to be configured to perform measurements of radio connection establishment request, received from the UE. The transceiver is further configured to send information related to the measurements of the radio connection establishment request to another RBS or a central controller. The processor is further configured to obtain a set of Downlink, DL demodulation reference signals associated with a DL control channel for the UE, based on said measurements of the radio connection establishment requests. The transceiver is further configured to transmit to the UE, a set of DL demodulation reference signals associated with a DL control channel, in a Random Access response.

According to a fourth aspect of the present invention, a User Equipment, UE for receiving radio connection establishment information using Orthogonal Frequency Division Multiplexing, OFDM from a plurality of Radio Base Stations, RBSs, is provided. The UE comprises a transceiver, a processor and a control unit for controlling the steps of the UE. The UE comprises a transceiver that is configured to receive broadcast system information on a Broadcast Channel, BCH in dedicated sub-frames from the plurality of RBSs, and to transmit a radio connection establishment request to a number of RBSs, based on the received broadcast system information. The transceiver is further configured to receive a radio connection establishment response S-from a RBS, wherein the radio connection establishment response comprises a set of Downlink, DL demodulation reference signals associated with a DL control channel. The processor is configured to be connected to the transceiver, and to configure the UE to use the set of DL demodulation reference signals for demodulating said DL control channel.

BRIEF DESCRIPTION OF DRAWINGS

These and other aspects, features and advantages of which the invention is capable of, will be apparent and elucidated from the following description of embodiments of the present invention, reference being made to the accompanying drawings, in which FIGS. 1A-D illustrate relations of radio network nodes, FIGS. 2-4 schematically illustrate a signaling flow chart according to some embodiments of the present invention, FIGS. 5-7 schematically illustrate flow-chart of method steps according to embodiments of the present invention, and FIGS. 8 and 9 schematically illustrate radio network nodes according to embodiments of the present invention.

ABBREVIATIONS

3GPP 3rd Generation Partnership Project
BCH Broadcast Channel
CoMP Coordinated Multi-Point transmission and reception
eNB Evolved NodeB
GSM Global System for Mobile Communications
HSPA High Speed Packet Access
LTE Long Term Evolution
MBSFN Multicast Broadcast Single Frequency Network
OFDM Orthogonal Frequency Division Multiplexing
RA Random Access
RACH RA Channel
RBS Radio Base Station
UE User Equipment

DETAILED DESCRIPTION

The basic concept of the invention relates to establishment of a radio connection between a User Equipment (UE) and a Radio Base Station (RBS) in a communication system.

FIGS. 1A-1D schematically illustrate relations of radio network nodes. FIG. 1A illustrates a plurality of radio base stations (RBS) 102, 104, 106 and a single User Equipment 108 within at least one of the coverage areas 110, 112, 114 of the respective RBSs. The UE may here receive broadcasted system information such as RACH information. FIG. 1B illustrates that a User Equipment 126 can transmit a message such as a RACH request reaching several RBSs 120, 122, 124. FIG. 1C schematically illustrates that a UE 130 is found to be within the coverage area 126 of RBS 128. FIG. 1D shows that a coverage area 136 can be tailored to suit the UE 134.

Figure 2:
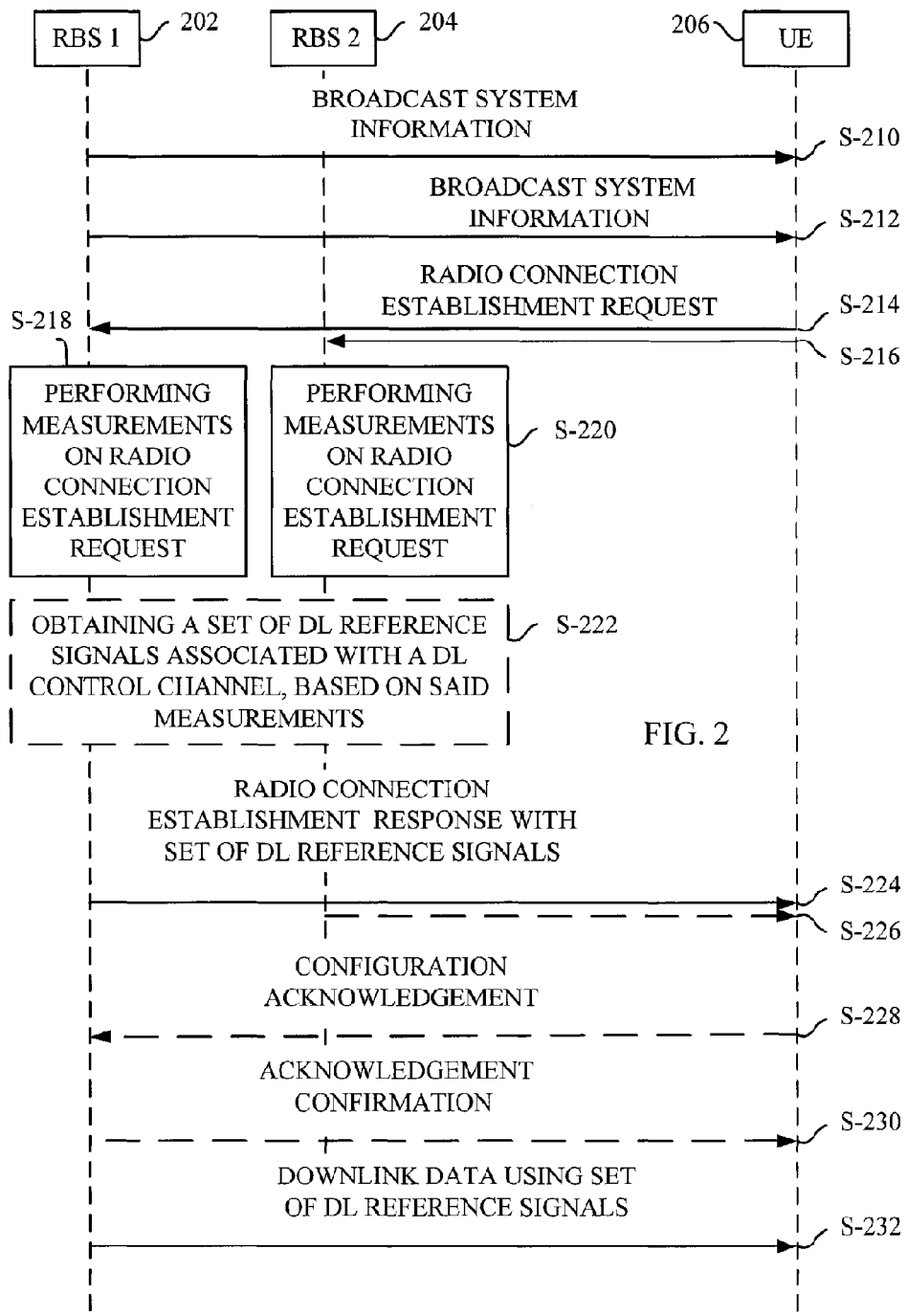

With reference to FIG. 2, illustrating a schematic signalling diagram, some embodiments of the present invention will be described.

Within a Broadcast Area, at least a first Radio Base Station (RBS), 202 and a second RBS, transmit system information using a Broadcast Channel using Multimedia Broadcast Single Frequency Network (MBSFN) format to a plurality of User Equipments (UEs), in steps S-210 and S-212, respectively. The system information is related to establishing a radio connection to said plurality of UEs. Further, broadcasting by the first RBS 202 and the second RBS 204 is performed synchronously in time on the BCH using MBSFN radio transmission format.

The broadcasted system information comprises Random Access Channel (RACH) information in general, and may comprise physical configuration information of the Random Access Channel. Examples of the physical configuration are available preambles, information where the RA time slots for Uplink (UL) RA transmission are located and which frequency bands can be used for initial transmission by a UE.

It should be mentioned that the system information that is broadcasted by the first RBS 202 is the same system information that is broadcasted by the second RBS 204. The same physical resources are used. They system information is further broadcast using a long cyclic prefix, such that the received system information as sensed by a UE benefits from constructive interference of signal components of the same information from separate RBSs.

At the time a UE out of the plurality of UEs wishes to establish a radio connection, the UE transmits a radio connection establishment request S-214, S-216 to the first and second RBS, 202, 204. The radio connection establishment request may comprise a preamble, which can be arbitrarily chosen out of the available preambles, is received in steps S-210, 212.

It should be noticed that although steps S-214 and S-216 are illustrated as separate transmissions, it is one and the same singular transmission that reaches both RBS 202 and RBS 204.

As mentioned earlier, the UE 206 is one representation of a plurality of UEs, for which reason the RBS 202 and RBS 204 may however receive multiple preambles from separate UEs.

The first RBS 202 now performs measurements on the received radio connection establishment request from the UE 206, in step S-218. Likewise, the second RBS 204 performs measurements on the received radio connection establishment request from the UE 206, in step S-220.

The measurements comprise determining the signal strength of the received radio connection establishment requests, and may also comprise determining the direction of receipt based on signal strength measurements using separate antenna ports. In addition measurements on the received radio connection establishment requests may comprise measuring the time of receipt for providing a proper UL timing to the UE.

In step S-222, it is obtained a set of DL reference signals associated with a DL control channel, based on the performed measurements.

Step S-222 has been illustrated as a broken square in FIGS. 2, to indicate that this step may comprise additional steps according to a distributed and a centralized mode of determining the set of DL reference signals associated with a DL control channel. The distributed mode will be discussed in connection with FIG. 3, whereas the centralized mode is discussed in connection with FIG. 4.

Figure 3:
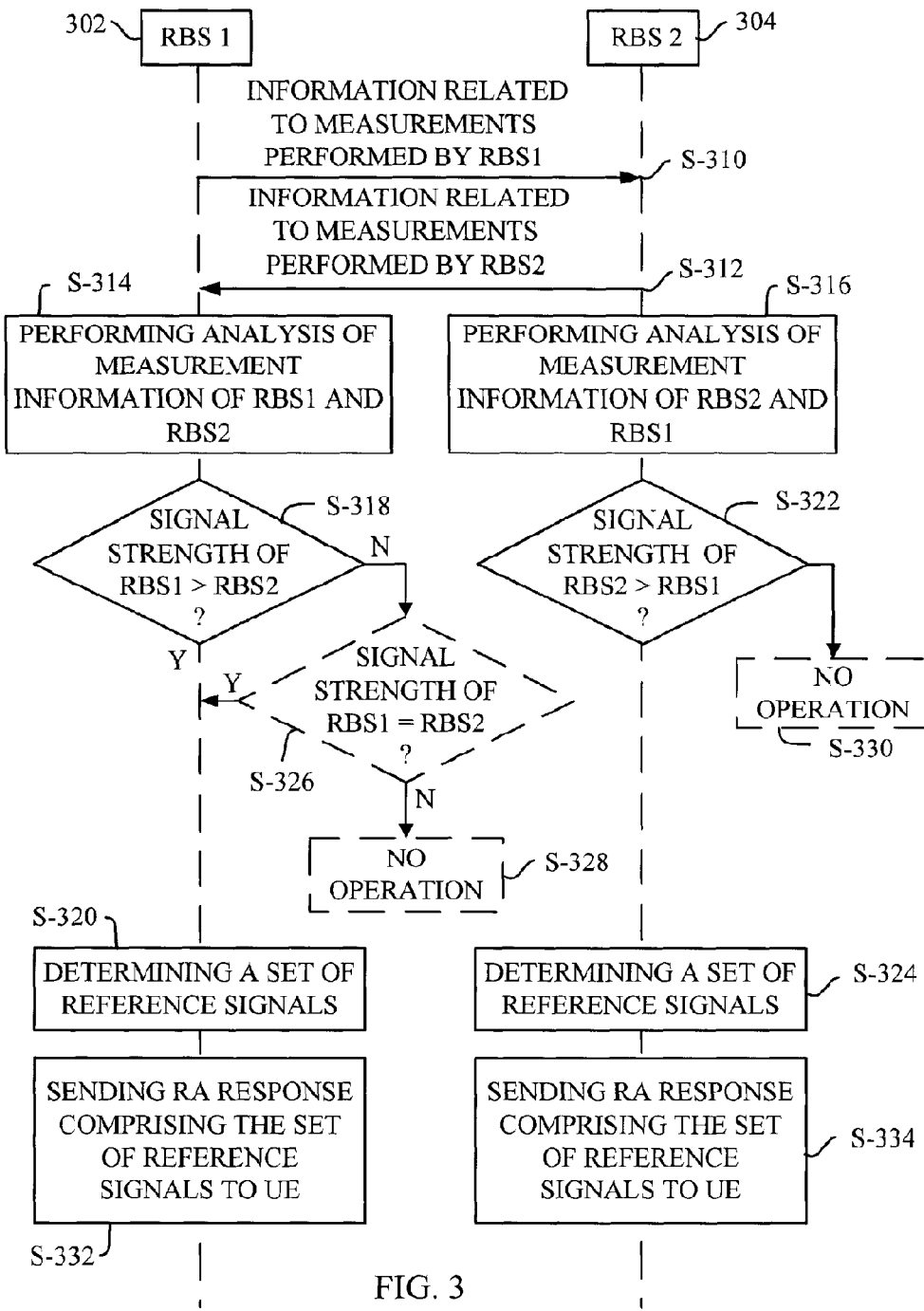

Although the signalling flow diagram of FIG. 2 is being described, reference will know be made to FIG. 3 related to the distributed mode, schematically illustrating steps in a signalling flow diagram where said steps correspond to step S-222.

FIG. 3 schematically illustrates a first RBS, 302 and a second RBS, 304, which correspond to the first RBS 202 and second RBS 204, respectively, of FIG. 2.

Having performed the measurement of the received radio connection establishment request by the first RBS 202 and the second RBS 204 in FIG. 2, the following step, in the distributed mode comprises sending information related to the measurements performed by the first RBS 302 to the second RBS 304 in step S-310. Also, the second RBS 304 of FIG. 3 sends information related to the measurements performed by the first RBS 302 to the first RBS 302 in step S-312, according to this distributed mode.

Having access to information related to measurements performed by the first 302 and the second RBS 304, analysis of the information related to the measurements is now performed by the first RBS 302 and the second RBS 304, in step S-314 and S-316, respectively.

In the case a signal strength as measured by the first RBS 302 is higher than a corresponding signal strength as measured by the second RBS 304, in a step of comparison S-318, it is decided that the first RBS 302 will be responsible for the next step of determining a set of DL reference signals associated with a DL control channel, in step S-320.

Likewise, in the case a signal strength as measured by the second RBS 304 is higher than a corresponding signal strength as measured by the first RBS 302, in a step of comparison S-322, it is decided that the second RBS 304 will be responsible for the step of determining a set of DL reference signals associated with a DL control channel in step S-324.

In the case a signal strength as measured by the first RBS 302 is not higher than the corresponding signal strength as measured by the second RBS 304, in the step of comparison S-318, an additional comparison can be performed by determining whether the signal strength as measured by the first RBS 302 equals to the corresponding signal strength as measured by the second RBS 304, in step S-326. In the case the two measured signal strengths are equal it can decided that the RBS having the lowest identifier, such as the Cell Global Identifier (CGI), will be responsible for the determination of the set of DL reference signals associated with a DL control channel. In the case the two compared signal strengths are not equal in step S-326, the steps of the method as performed within the first RBS 302 may be halted, in step S-328 of performing no operation.

Similarly, in the case the second RBS 304 determines in the comparison S-322 that the signal of the second RBS 304 is not stronger that the signal of the first RBS 302, no operation may be performed by the second RBS 304, in step S-330.

It should be kept in mind that the determination of DL demodulation reference signals associated with DL control channel, may be jointly determined by the first RBS 302 and the second RBS 304. If this case the set of DL demodulation reference signals associated with DL control channel, may represent at least one antenna port from each one of the first RBS 302 and the second RBS 304.

The step of determining DL demodulation reference signals associated with DL control channel, is based on the measurements of the radio connection establishment requests. Based on measured signal strengths by using a multiple of antenna ports of the first RBS and the second RBS, an estimate of the direction in which the UE is located is obtained. Since subsequent communication with the UE preferably is directed in the direction of the UE, the antenna ports which detected a relatively high signal strength, will be used for DL communication. The set of DL demodulation reference signals may thus be selected from the DL demodulation reference signals of the high signal strength antenna ports.

It can further be noted that the determination of a set of DL demodulation reference signals associated with a DL control channel may comprise a single DL demodulation reference signal, associated with a singular existing data coverage area. As mentioned above the set of DL demodulation reference signals associated with a DL control channel may comprise two or more DL demodulation reference signals associated with a coordinated data coverage area, such as a Coordinated Multi-Point transmission and reception area. Alternatively, the set of DL demodulation reference signals associated with a DL control channel may comprise one or more DL demodulation reference signals associated with a data coverage area to be started up, due to for instance of the switching of a UE from idle to connected mode.

Returning to the signalling flow diagram of FIG. 3, subsequent to the step of determining a set of DL demodulation reference signals associated with a DL control channel in step S-320, the first RBS 302 performs sending a radio connection establishment response, such as a Random Access response comprising the set of DL demodulation reference signals, or at least information about the set of DL demodulation reference signals, associated with DL control channel, in step S-332.

Similarly, after step S-324 of determining a set of DL demodulation reference signals associated with a DL control channel, sending a radio connection establishment response, such as a Random Access response comprising the set of DL demodulation reference signals, or at least information about the set of DL demodulation reference signals, associated with DL control channel, is performed by the second RBS 304 in step S-334.

Figure 4:
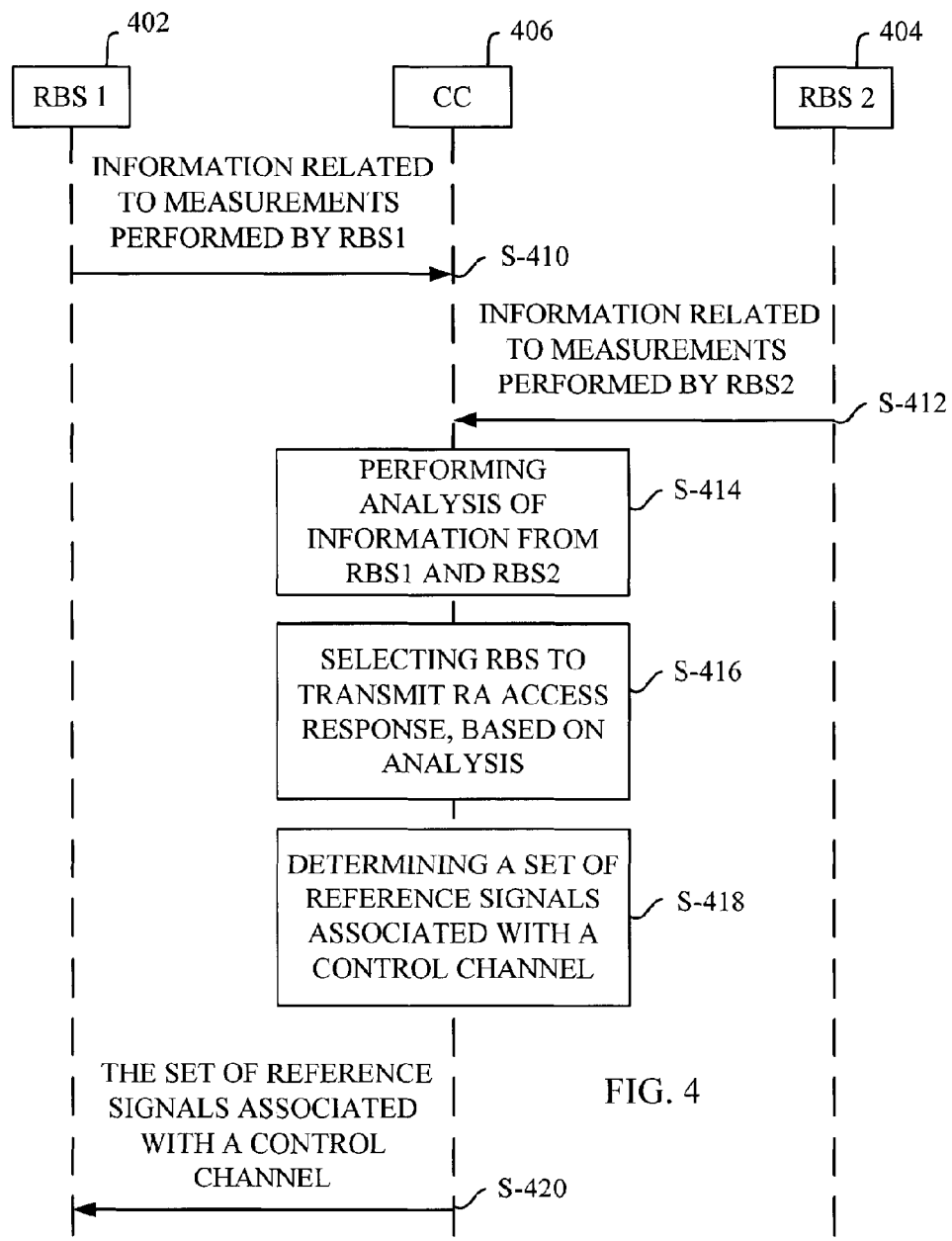

Having described the distributed mode of determining a set of DL demodulation reference signals associated with a DL control channel referring to FIG. 3, the centralized mode of determining a set of DL demodulation reference signals associated with a DL control channel will now we discussed with reference to FIG. 4, illustrating a signalling flow diagram according to some embodiments of the present invention.

FIG. 4 illustrates a first RBS 402 and a second RBS 404, as well as a central controller 406.

Having performed measurements on the received radio connection establishment request in step S-218, as shown in FIG. 2, the first RBS 402 can now send information related to the measurements performed by the first RBS 402 to a central controller 406, in step S-410. Similarly, the corresponding step by the second RBS 404 of sending information related to measurements performed by the second RBS 404 is performed by the RBS 404 in step S-412.

The central controller 406 now performs an analysis of information as received from the first RBS 402 and the second RBS 404, in step S-414. Based on the analysis of the received information, the central controller now performs selecting a RBS to be responsible for the transmission of a radio connection establishment response, such as a Random Access response, in step S-416. Herein, the first RBS 402 is selected, as will become apparent down below. The central controller then determines a set of DL demodulation reference signals associated with a DL control channel, based on the performed analysis in step S-418, and related to the selection of a RBS to be responsible for the transmission of a radio connection establishment response to the UE 206.

As mentioned above, the set of DL demodulation reference signals are related to the selection of the RBS for the reason that each DL demodulation reference signal is related to an antenna port of an RBS.

Having determined the set of DL demodulation reference signals associated with a DL control channel, said set or at least information about said set of DL demodulation reference signals associated with a DL control channel, is then sent to the RBS responsible to transmit the radio connection establishment response to the UE 206, which in this case is the first RBS 402, in step S-420. The centralized mode of reference signal determination is thus ended.

Returning to FIG. 2 illustrating the overall signalling flow diagram, step S-222 of obtaining a set of DL demodulation reference signals associated with a DL control channel is hence performed, as described in FIGS. 3 and 4.

A radio connection establishment response comprising the set of DL demodulation reference signals associated with a DL control channel is then transmitted by the RBS selected to be responsible for said transmission in step S-224, based on the performed measurements on the radio connection establishment requests, in steps S-218 and S-220.

According to an alternative embodiment of the present invention, a further radio connection establishment response comprising a set of DL demodulation reference signals associated with a DL control channel, can also be transmitted by the second RBS 204, as indicated with a broken line in step S-226.

The radio connection establishment response may comprise a Random Access response. Furthermore, the RA response may comprise a time alignment message to provide proper Uplink (UL) timing to the UE 206. The RA response may also comprise a Random Access (RA) Radio Network Temporary Identifier (RA-RNTI) that is unique to the preamble and to the time-frequency physical resources that were used in sending the radio connection establishment request, in step S-214, S-216. In addition, the RA response may also comprise an UL resource grant for transmission by the UE.

The UE 206 thus receives a radio connection establishment response in step S-224, with the set of DL demodulation reference signals associated with a DL control channel. In case the UE 206 recognises the preamble in the RA-RNTI, the UE knows that the radio connection establishment response is indeed intended for said UE.

The UE 206 also receives the set of DL demodulation reference signals, which the UE has prior knowledge of, from the broadcast system information. The UE can now determine the modulation effect by the channel used. Based on knowledge of the signal the UE 206 can determine the channel modulation. Using this obtained channel modulation, an associated control channel is demodulated using the same steps as used for demodulation of the DL demodulation reference signals. The control channel is thus demodulated and the UE can thus listen to control data as sent on the control channel. As the UE 206 notices that the DL demodulation reference signals can be used to demodulate the control channel, the UE sends a configuration acknowledgement at least to the first RBS 402 in step S-228. The first RBS 402 then confirms the received configuration acknowledgement in the step S-230. The first RBS 402 may thereafter use the DL reference signals for transmission of downlink data, for instance in step S-232.

Figure 5:
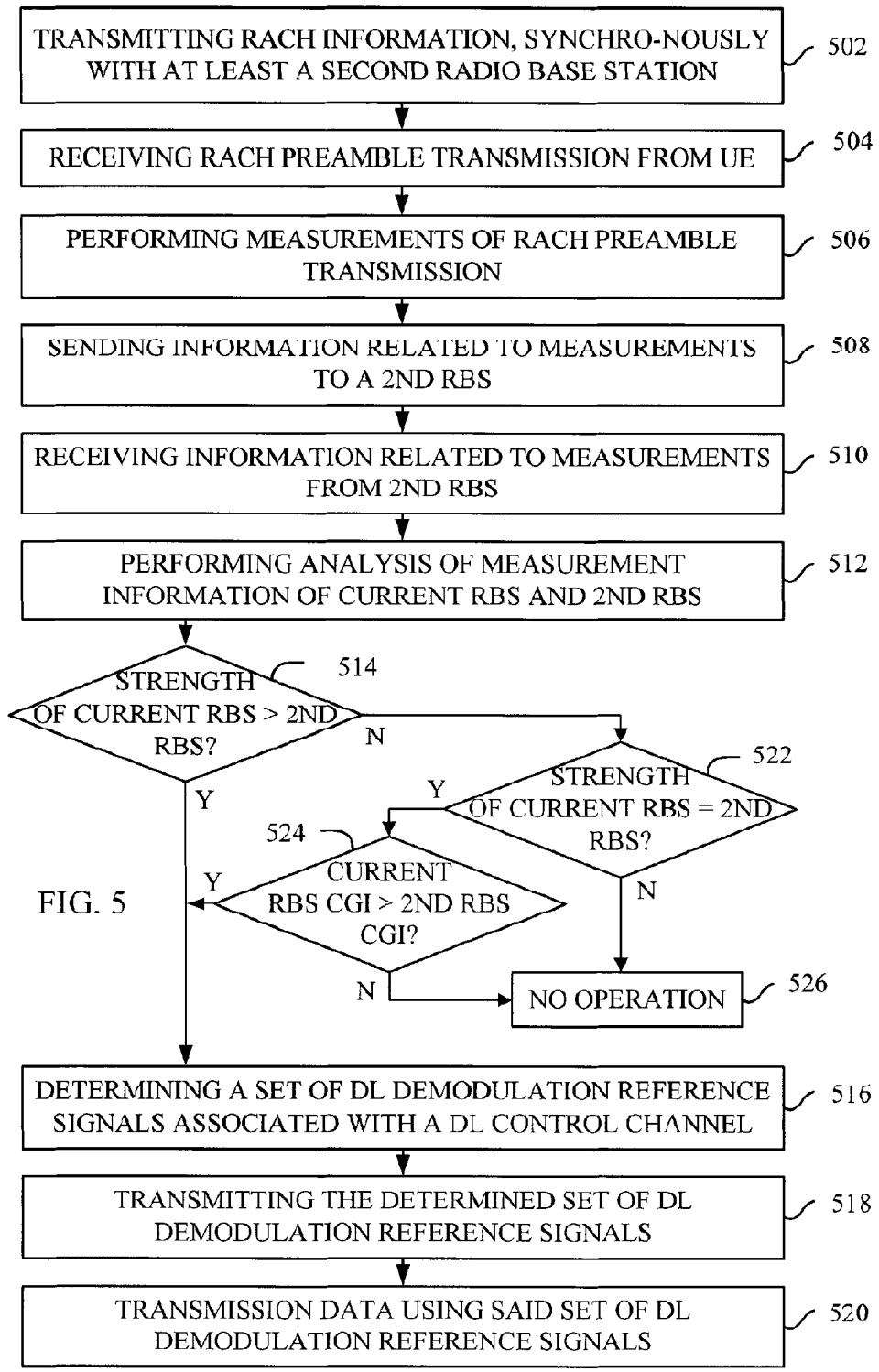
Figure 6:
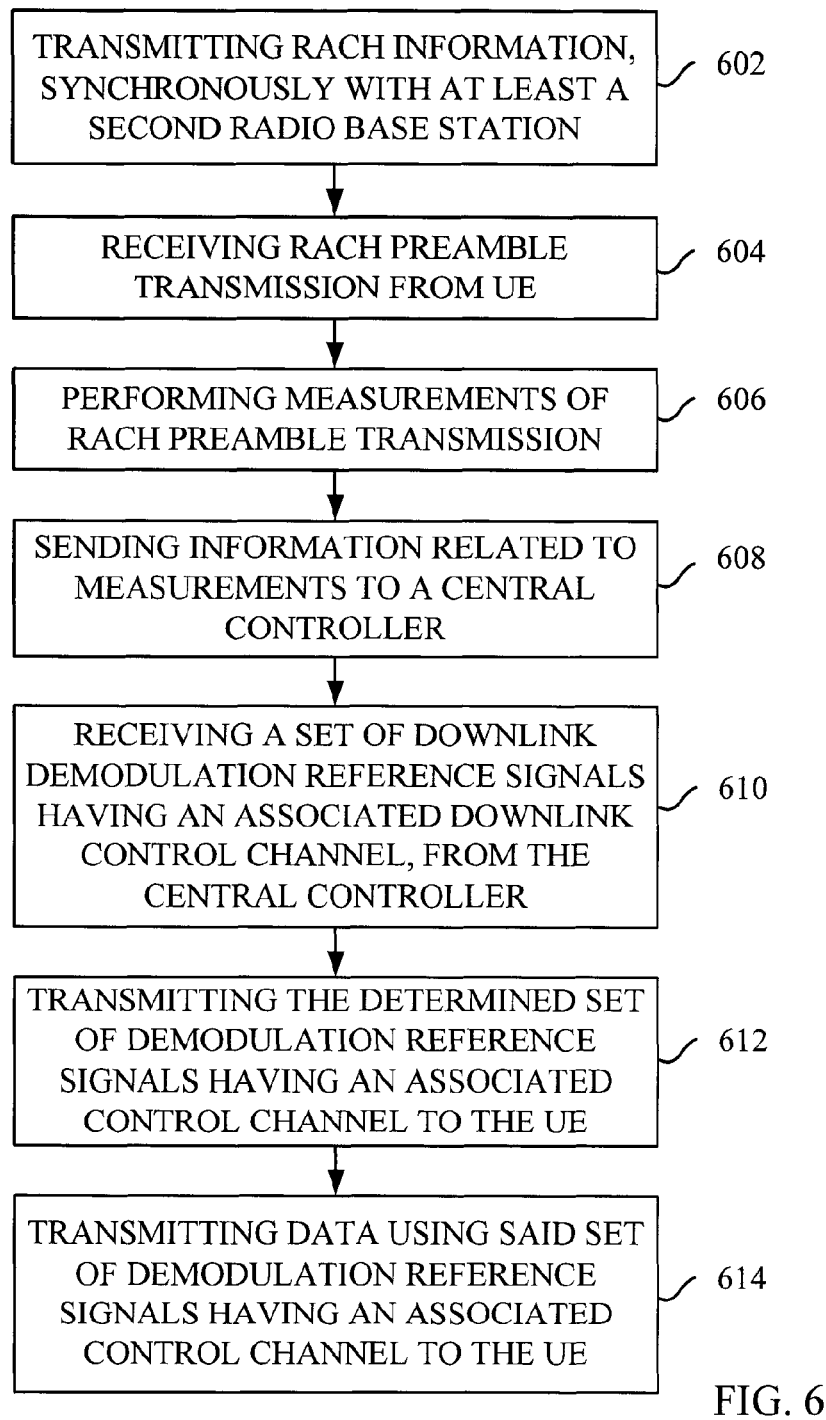

With reference to FIGS. 5 and 6, method step of method performed in a first RBS in a distributed and a centralized mode, respectively, are illustrated.

The first steps 502 and 602 comprise transmitting RACH information synchronously with at least a second radio base station, in steps 502 or 602. This second RBS can be the RBS 204 or RBS 304. The next step in both methods is receiving a Random Access Channel preamble transmission from a UE 206, in steps 504 or 604. Thereafter the first RBS 202 performs measurements of the RACH preamble transmission, in steps 506 or 606.

In the distributed mode, the method then comprises sending information related to measurements to a second RBS, in step 508, which second RBS is RBS 304.

Thereafter the method comprises receiving information related to measurements performed by the second RBS from the second RBS, in step 510. The method then comprises performing analysis of data obtained by the measurements from the current first RBS 302 and the second RBS 304.

In the case it is detected that a signal strength from the current RBS is higher than the one of the second RBS, in step 514, the following step is the step of determining a set of Downlink demodulation reference signals associate with a DL control channel, in step 516. Having determined said set of DL demodulation reference signals associate with a DL control channel, said is transmitted in a random access response to the UE, in step 518. Thereafter, the method comprises transmitting data using said set of DL demodulation reference signals associated with a DL control channel, in step 520, for demodulation of the sent data by using the provided set of DL demodulation reference signals.

Is the detected signal strength of the current RBS is not higher than the signal strength of the second RBS in step 514, the method comprises determining whether the signal strength of the current RBS is equal to the signal strength of the second RBS, in step 522. In case the two signal strengths are equal, the method comprises determining which RBS has the highest identity number, for instance the Cell Global Identity; CGI. As the method is being performed in the first RBS, the method continues in the case the first RBS is chosen in step 524.

In the case the signal strength of the current RBS is not stronger than the signal strength of the second RBS in step 514, and the two signal strengths are not equal, the current RBS will not continue executing the method; hence no operation in step 526. This steps can also be reached by having equally strong signals in step 522 and having a CGI of the second RBS higher than the one of the current RBS, in step 524.

The method as executed in the centralized mode, continues after the common step of performing measurements of RACH preamble transmission in step 606. The next step is sending information related to measurements to a central controller, in step 608. From the central controller a set of downlink demodulation reference signals associated with a DL control channel, is received in step 610. Thereafter, the method comprises transmitting the determined set of DL demodulation reference signals associated with a DL control channel to the UE, in step 612. Data is then transmitted by using the determined set of DL demodulation reference signals associated with a DL reference DL control channel, in step 614.

FIG. 7 illustrates a flow-chart of method steps performed by a User Equipment (UE). The method starts by receiving RACH information on a Broadcast Channel, in step 702, which corresponds to signalling steps S-210, S-212 in FIG. 2.

Then the UE transmits a RACH preamble based on the received RACH information, in step 704. The received RACH information comprises the available preambles to use by the UE. After having transmitted the RACH request, a RACH response is received in the method. The RACH response comprises a set of DL demodulation reference signals associated with a DL control channel, in step 706. In step 708 the UE is configured to use the set of DL demodulation reference signals to demodulate a DL control channel such that the UE can listen to the control channel and respond accordingly.

It has thus been described a method in a first Radio Base Station, RBS 204, 302, 402, 800 for communicating radio connection establishment information using Orthogonal Frequency Division Multiplexing, OFDM to a plurality of User Equipments, UEs 206, 900, the method comprising broadcasting system information on a Broadcast Channel, BCH S-210, S-212, 502, 602 using a Multicast Broadcast Single Frequency Network, MBSFN radio transmission format to said plurality of UEs 206, where the system information is related to establishing a radio connection between the first RBS and at least one UE out of the plurality of UEs, and wherein the broadcasting further is performed synchronously in time with broadcasting the same system information on BCH using MBSFN radio transmission format by at least a second RBS (202). The Method comprises receiving a radio connection establishment request (S-214, S-216, 504, 604) from a UE of the plurality of UEs and the step of performing measurements of the radio connection establishment request as received from the UE (S-218, 506, 606). The method comprises sending information related to the measurements of the radio connection establishment request (S-310, 508, 608) to a second RBS (304) or central controller (404), as well as obtaining a set of DL demodulation reference signals associated with a DL control channel (S-220, S-322, S-418, 516, 610) for the UE (206). In addition, it comprises transmitting to said UE a radio connection establishment response comprising the set of DL demodulation reference signals associated with a DL control channel (S-222, S-326, 518, 612).

It has also been described a method in a User Equipment, UE (206, 900) for configuring said User Equipment, UE based on radio connection establishment information using Orthogonal Frequency Division Multiplexing, OFDM from a plurality of Radio Base Stations, RBSs (202, 204, 302, 402). The method comprises receiving broadcast system information on a Broadcast Channel, BCH in dedicated sub-frames (S-210, S-212, 702) from the plurality of RBSs (202, 204, 302, 402), and transmitting a radio connection establishment request (S-214, S-216, 704) to a number of RBSs (202, 204, 302, 402), based on the received system information. The method further comprises receiving a radio connection establishment response(S-222, 706) from an RBS (204), said radio connection establishment response comprising a set of Downlink, DL demodulation reference signals associated with a DL control channel, and the step of configuring the UE by demodulating said DL control channel (708) using the set of DL demodulation reference signals associated with the DL control channel.

FIG. 8 schematically illustrates a Radio Base Station, RBS 204, 302, 402, 800 for communicating radio connection establishment information with a plurality of mobile communication devices, comprising a transceiver 802, a scheduler 804 and a processor 806. In addition a control unit 808 is comprised. The transmitter is configured to be connected to the scheduler 804, the processor 806 and to the control unit 808.

The a transceiver 802 is configured to broadcast system information related to establishing a radio connection on a Broadcast Channel, BCH S-210, S-212, 502, 602 using a Multicast Broadcast Single Frequency Network, MBSFN radio transmission format to said plurality of User Equipments, UEs 206, 900, and configured to receive a radio connection establishment request S-214, S-216, 504, 604 from a UE 206, 900.

The scheduler 804 is configured to schedule the transceiver to broadcast the system information synchronously in time with at least another RBS broadcasting the same system information on BCH using MBSFN radio transmission format. The processor 806 is configured to be connected to the scheduler, and to be configured to perform measurements of radio connection establishment request S-218, 506, 606 received from the UE. The transceiver 802 is further configured to send information related to the measurements of the radio connection establishment request S-310, S-410 to another RBS 304 or a central controller 404. The processor 806 is further configured to obtain a set of Downlink, DL demodulation reference signals associated with a DL control channel for the UE, based on said measurements of the radio connection establishment requests. The transceiver 802 is further configured to transmit to the UE 206, 900 a set of DL demodulation reference signals associated with a DL control channel, in a Random Access response S-222, S-326, 518, 612.

FIG. 9 schematically presents a User Equipment, UE 900 for receiving radio connection establishment information using Orthogonal Frequency Division Multiplexing, OFDM from a plurality of Radio Base Stations, RBSs, comprising a transceiver 902, a processor 904 and a control unit for controlling the steps of the UE. The UE comprises a transceiver 902 that is configured to receive broadcast system information on a Broadcast Channel, BCH in dedicated sub-frames S-210, S-212, 702 from the plurality of RBSs 202, 204, 302, 402, and to transmit a radio connection establishment request S-214, S-216, 704 to a number of RBSs, based on the received broadcast system information. The transceiver is further configured to receive a radio connection establishment response S-322, 706 from a RBS, wherein the radio connection establishment response comprises a set of Downlink, DL demodulation reference signals associated with a DL control channel. The processor is configured to be connected to the transceiver, and to configure the UE to use the set of DL demodulation reference signals for demodulating said DL control channel.

Embodiments of the present invention comprise the following advantages:

Single Frequency Network transmission of system information brings several advantages e.g. diversity gain, significantly reduced inter-cell interference, and better support for cell sleep.

The decoupling of system information broadcast and data transmission enables the use of SON algorithms and re-configurable antennas that traditionally would have affected the system coverage.

By introducing SFN transmission of broadcast information in the LTE MBSFN sub-frames we enable these benefits with minimal changes.

It must be emphasized that the present invention can be varied in many ways. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

It is made clear that presented embodiments may well be combined forming new embodiments not explicitly described herein.

In the claims, the term "comprises/comprising" does not exclude the presence of other elements or steps. Additionally, although individual features may be included in separate claims, these may be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

Although the present invention has been described above with reference to (a) specific embodiment(s), it is not intended to be limited to the specific form set forth herein. Rather, the invention is limited only by the accompanying claims and, other embodiments than the specific above are equally possible within the scope of these appended claims.

The invention claimed is:

1. A method, in a first Radio Base Station (RBS), for communicating radio connection establishment information using Orthogonal Frequency Division Multiplexing (OFDM) to a plurality of User Equipment (UE), the method comprising:
broadcasting system information on a Broadcast Channel (BCH) using a Multicast Broadcast Single Frequency Network (MBSFN) radio transmission format to the plurality of UEs, wherein the system information is related to establishing a radio connection between the first RBS and at least one UE out of the plurality of UEs, and wherein the broadcasting is performed synchronously in time with broadcasting the same system information on BCH using MBSFN radio transmission format by at least a second RBS;
receiving a radio connection establishment request from a UE of the plurality of UEs;
performing measurements of the radio connection establishment request as received from the UE;
sending information related to the measurements of the radio connection establishment request to the second RBS or a central controller;
obtaining a set of Downlink (DL) demodulation reference signals associated with a DL control channel for the UE;
transmitting, to the UE, a radio connection establishment response comprising the set of DL demodulation reference signals associated with the DL control channel.

2. The method of claim 1, wherein the system information comprises Random Access Channel (RACH) information.

3. The method of claim 2, wherein the RACH information comprises physical configuration information of the RACH.

4. The method of claim 1, wherein the radio connection establishment request comprises a Random Access preamble related to the system information.

5. The method of claim 1, further comprising:
receiving information related to the measurements of the radio connection establishment request from the second RBS;
performing analysis of information related to the measurements of the radio connection establishment requests.

6. The method of claim 5, wherein the obtaining a set of DL demodulation reference signals comprises determining the set of DL demodulation reference signals associated with the DL control channel based on analysis of the information related to the measurements of the radio connection establishment requests.

7. The method of claim 6, wherein the determining the set of DL demodulation reference signals comprises mapping a received Random Access preamble and DL demodulation reference signals associated with a DL control channel.

8. The method of claim 6:
further comprising determining a set of physical antennas to use for the transmitting the radio connection establishment response to the UE based on analysis of the information related to the measurements of the radio connection establishment requests;
wherein the transmitting the radio connection establishment response to the UE comprises transmitting, to the UE, the set of DL demodulation reference signals associated with the DL control channel using the set of physical antennas.

9. The method of claim 8:
further comprising determining antenna configuration parameters for configuring the set of physical antennas based on analysis of the information related to the measurements of the radio connection establishment requests;
wherein the transmitting the radio connection establishment response to the UE comprises using the determined antenna configuration parameters for transmitting, to the UE, the set of DL demodulation reference signals associated with the DL control channel using the set of physical antennas.

10. The method of claim 5:
wherein the sending information related to the measurements of the radio connection establishment request comprises sending the information related to the measurements of the radio connection establishment request over an X2 interface;
wherein the receiving information related to the measurements of the radio connection establishment request from the second RBS comprises receiving the information related to the measurements of the radio connection establishment request from the second RBS over an X2 interface.

11. The method of claim 1, wherein the obtaining the set of DL demodulation reference signals associated with the a DL control channel comprises receiving the set of DL demodulation reference signals associated with the DL control channel from the central controller.

12. The method of claim 11:
further comprising receiving a set of physical antennas to use for the transmitting the radio connection establishment response to the UE;
wherein the transmitting the radio connection establishment response to the UE comprises transmitting the set of DL demodulation reference signals associated with the DL control channel to the UE using the set of physical antennas.

13. The method of claim 12:
further comprising receiving antenna configuration parameters for configuring the set of physical antennas;
wherein the transmitting the radio connection establishment response to the UE comprises using the received antenna configuration parameters for transmitting, to the UE, the set of DL demodulation reference signals associated with the DL control channel using the set of physical antennas.

14. The method of claim 1, wherein the broadcasting system information comprises broadcasting system information using the BCH allocated in dedicated MBSFN sub-frames.

15. A method, in a User Equipment (UE), for configuring the US based on radio connection establishment information received using Orthogonal Frequency Division Multiplexing (OFDM) from a plurality of Radio Base Stations (RBS), the method comprising:
receiving broadcast system information on a Broadcast Channel (BCH) in dedicated sub-frames from the plurality of RBSs;
transmitting a radio connection establishment request to multiple RBSs based on the received system information;
receiving a radio connection establishment response from a first RBS, the radio connection establishment response comprising a set of Downlink (DL) demodulation reference signals associated with a DL control channel;
configuring the UE by demodulating the DL control channel using the set of DL demodulation reference signals associated with the DL control channel.

16. The method of claim 15, wherein the system information comprises Random Access Channel (RACH) information.

17. The method of claim 16, wherein the system information comprises physical configuration information of the RACH.

18. The method of claim 15, where the radio connection establishment request comprises a Random Access preamble.

19. The method of claim 15, further comprising adapting the UE to the demodulated DL control channel.

20. A Radio Base Station (RBS) for communicating radio connection establishment information with a plurality of mobile User Equipment (UE), the RBS comprising:
a transceiver configured to:
broadcast system information related to establishing a radio connection on a Broadcast Channel (BCH) using a Multicast Broadcast Single Frequency Network (MBSFN) radio transmission format to the plurality UEs;
receive a radio connection establishment request from a first UE;
a scheduler connected to the transceiver and configured to schedule the transceiver to broadcast the system information synchronously in time with at least another RBS broadcasting the same system information on the BCH using MBSFN radio transmission format;
a processor connected to the scheduler and to the transceiver, the processor configured to perform measurements of the radio connection establishment request received from the first UE;
wherein the transceiver is further configured to send information related to the measurements of the radio connection establishment request to the another RBS or a central controller;
wherein the processor is further configured to obtain a set of Downlink (DL) demodulation reference signals associated with a DL control channel for the first UE based on the measurements of the radio connection establishment requests;
wherein the transceiver is further configured to transmit the set of DL demodulation reference signals associated with the DL control channel to the first UE in a Random Access response.

21. A User Equipment (UE) for receiving radio connection establishment information using Orthogonal Frequency Division Multiplexing (OFDM) from a plurality of Radio Base Stations (RBS), the UE comprising:
a transceiver configured to:
receive broadcast system information on a Broadcast Channel (BCH) in dedicated sub-frames from the plurality of RBSs,
transmit a radio connection establishment request to multiple of RBSs based on the received broadcast system information;
receive a radio connection establishment response from a first RBS, wherein the radio connection establishment response comprises a set of Downlink (DL) demodulation reference signals associated with a DL control channel;
a processor connected to the transceiver and configured to cause the UE to use the set of DL demodulation reference signals for demodulating the DL control channel.

* * * * *

UNITED STATES PATENT AND TRADEMARK OFFICE
CERTIFICATE OF CORRECTION

| | |
|---|---|
| PATENT NO. | : 8,855,004 B2 |
| APPLICATION NO. | : 13/817849 |
| DATED | : October 7, 2014 |
| INVENTOR(S) | : Frenger et al. |

It is certified that error appears in the above-identified patent and that said Letters Patent is hereby corrected as shown below:

In the drawings

In Fig. 5, Sheet 5 of 7, for Tag "502", in Line 1, delete "SYNCHRO-NOUSLY" and insert -- SYNCHRONOUSLY --, therefor.

In the claims

In Column 12, Line 62, in Claim 10, delete "X2interface." and insert -- X2 interface. --, therefor.

In Column 12, Line 64, in Claim 11, delete "the a" and insert -- the --, therefor.

In Column 13, Line 46, in Claim 18, delete "where the" and insert -- wherein the --, therefor.

Signed and Sealed this
Twenty-eighth Day of June, 2016

Michelle K. Lee
*Director of the United States Patent and Trademark Office*